Jan. 17, 1950 F. O. RILEY ET AL Re. 23,191

DOOR CHECK AND HOLD OPEN

Original Filed May 23, 1946

INVENTOR.
Frank O. Riley
Roy F. Anderson

BY Barnes, Kisselle, Laughlin & Raisch

ATTORNEYS

Patented Jan. 17, 1950

Re. 23,191

UNITED STATES PATENT OFFICE 23,191

DOOR CHECK AND HOLD OPEN

Frank O. Riley and Roy F. Anderson, Detroit, Mich., assignors to General Motors Corporation, Detroit, Mich., a corporation of Delaware Original No. 2,442,177, dated May 25, 1948, Serial No. 671,709, May 23, 1946. Application for reissue May 2, 1949, Serial No. 90,986

12 Claims. (Cl. 16—86)

Matter enclosed in heavy brackets [ ] appears in the original patent but forms no part of this reissue specification; matter printed in italics indicates the additions made by reissue This invention relates to door checks and hold-open devices.

In the new type of heavy doors, and especially in view of their tendency to swing closed by reason of the pitch in the pivot line due to modern styling, it has been found desirable and necessary to provide hold-open devices in connection with door checks. These have usually taken the form of spring or friction latches or catches to retain the door in its fully open position when it has been thrown wide open, but they do not function when the door is not initially swung wide open and they are, therefore objectionable on this account as the door is quite liable to swing back and catch some part of the person or clothing of one entering or leaving the car. It has already been proposed to overcome this difficulty by providing a spring which tends to open the door and swing it outwardly.

It is the object of the present invention to provide an improved door check and hold-open of this type in which the amount of throw of the door may be varied by adjusting the length of the linkage, but without altering the effectiveness or operation of a rubber bumper or stop that is used to arrest the outward throw of the door. This will more fully appear hereinafter.

Figure 1:
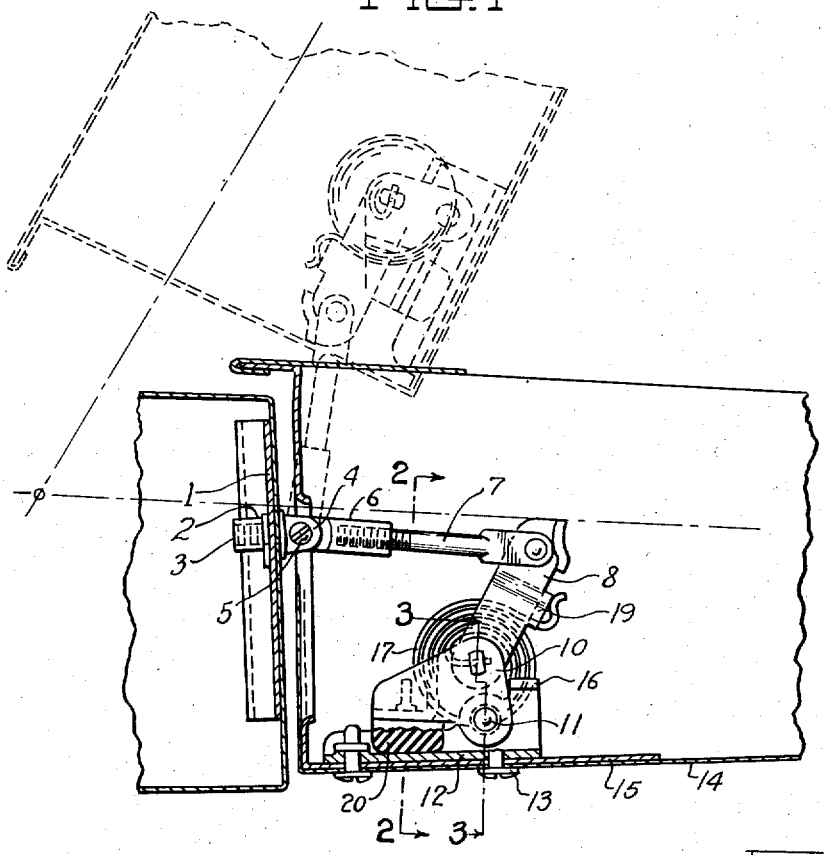
Fig. 1 is a fragmentary section through the door and the body pillar showing a plan view of the check and the hold-open device.
Figure 4:
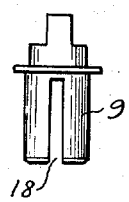
Fig. 4 is a detail of the pivot pin that carries the clock spring which tends to keep the door open.

1 is an anchor plate secured to the inside of the body pillar by spot welding or otherwise. Secured to this is a threaded sleeve or nut 2 into which screws a bolt 3 which has a head that forms a knuckle 4 for the pin 5 on which swings the interiorly threaded sleeve 6 which is arranged to receive the externally threaded stem 7. Sleeve 6 and stem 7 form the two sections of a toggle arm which is pivoted to the other toggle arm 8. The other toggle arm 8 is pivoted by pin 9 to bell crank lever 10, which in turn is pivoted at 11 to the anchoring bracket 12. This bracket is secured by bolts and nuts 13 to the inside panel 14 and the angle strip 15 which reinforces the inside door panel and forms the jamb face of the door and part of the overlap flange. Bell crank lever 10 has a limited possible throw due to turned-over stop 16 on the anchoring bracket 12. The clock spring 17 has its inner end anchored in the slot 18 of pin 9. The outer end of the spring engages the turned-over lug 19 on toggle arm 8. It will be noted that this tends at all times to straighten the toggle and resist the door closing, as shown by the dotted lines in Fig. 1.

Figure 2:
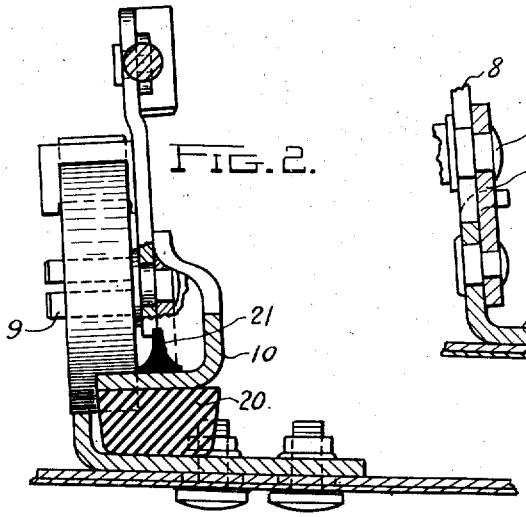
Fig. 2 is a section on the line 2—2 of Fig. 1.
Figure 3:
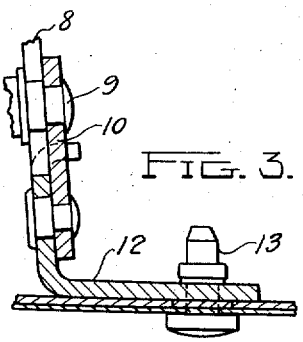
Fig. 3 is a section on line 3—3 of Fig. 1.

The bell crank lever 10 has on its free end a thick rubber bumper 20 which at all times tends to bear against the plate portion of the bracket 12, as shown in Figs. 1 and 2. This rubber bumper has a nib portion 21 which can be squeezed through an opening in the turned-over end of the bell crank lever 10. The head of the nib then expands and locks the rubber bumper in place on the end of the lever arm.

*The turned over spur on the toggle arm 8 connected to toggle arm 7 (see Figs. 1 and 2) is a stop which engages toggle arm 7. The stop stops the unfolding of the arms just before they reach the straight line position (see Fig. 1).*

The operation of the device is as follows: When the door is unlatched the clock spring 17 tends to open the door. If the door is jerked violently open the toggle arms, when they reach the limit of their movement which is the [substantially] *near* straight-line position, *short of throwing over center,* as shown in the dotted lines of Fig. 1, will then put a tractile stress on the bell crank lever 10 tending to turn it on its pivot 11, but this turning movement is resisted by the distortion of the rubber bumper 20. This placing of the rubber bumper on the lever arm has several advantages. One is that there is never a striking impact on the bumper, that is, the bumper is not carried on a member that has considerable throw before the bumper makes an impact with the member that stops it, nor is it carried on a stationary member where the bumper is impacted by a member that has considerable throw. These actions tend to wear and destroy the bumper.

The bumper in this improved door check, when it comes into action, simply takes a squeeze and, therefore, is not subjected to the wear and destruction involved in a heavy impact. Further, this arrangement provides a convenient way of locating the bumper at a desirable location without interfering with the design of the parts of the door check. It also permits the adjustment of the throw of the door check by changing its length without any effect whatever in the bumper. The torsion spring at its inner end, when put under stress, as shown in the full lines, tends to unwind or turn clockwise and thereby throws the bell crank lever 10 tightly up against the stop 16 to prevent any rattling. When the door is opened the outer end of the spring immediately goes into action and tends to straighten the toggle and hold the door open at any and all positions. The strength of the spring can be such that it will immediately throw the door completely open, but this is usually undesirable and it will be better to have the spring interpose just enough stress to keep the door in any position of opening, at least near the outer limit of the throw of the door. It is undesirable to throw the door wide open by spring action. Another car may be close or some other interfering object. A strong spring that throws the door wide open is also undesirable because it makes it much harder to close the door. We want it understood, however, that so far as the lever-bumper arrangement is concerned, the device can be used without the spring, in which case it will function only as a door check.

It will be obvious that the throw of the door may be easily adjusted by simply taking out the knuckle pin 5 and then turning the sleeve section 6 of the outer toggle arm upon the threaded stem 7. This affords a very easy adjustment without in any way disturbing the bumper.

In the claims where the "bumper" is referred to, we desire it to be understood that this may be a rubber bumper, a spring bumper or a bumper of any other deformable material.

We claim:

1. A door check comprising a pair of toggle arms, one of which can be pivoted to one member of a pair of members, a door pillar and a body pillar, a lever for pivoting to the other member of the pair of members and to the other toggle arm and a deformable bumper on said lever arranged to contact a surface and be distorted when the toggle arms of the check straighten out and reach the limit of their movement and to thereby arrest the check by the cushioning action of the bumper.

2. A door check comprising a pair of toggle arms, one of which can be pivoted to one member of a pair of members, a door pillar and a body pillar, a lever for pivoting to the other member of the pair of members and to the other toggle arm and a deformable bumper on said lever arranged to contact a surface and be distorted when the toggle arms of the check straighten out and reach the limit of their movement and to thereby arrest the check by the cushioning action of the bumper, the said lever being a bell crank arm in which one end of the bell crank is pivoted to said other member, the other end of the bell crank carrying the bumper and the elbow of the bell crank having said pivotal connection with the toggle arm.

3. A door check comprising a pair of toggle arms, one of which can be pivoted to one member of a pair of members, a door pillar and a body pillar, a lever for pivoting to the other member of the pair of members and to the other toggle arm and a deformable bumper on said lever arranged to contact a surface and be distorted when the toggle arms of the check straighten out and reach the limit of their movement and to thereby arrest the check by the cushioning action of the bumper, and a spring at all times stressing the toggle arms and tending to straighten the same to open the door.

4. A door check comprising a pair of toggle arms, one of which can be pivoted to one member of a pair of members, a door pillar and a body pillar, a lever for pivoting to the other member of the pair of members and to the other toggle arm, a deformable bumper on said lever arranged to contact a surface and be distorted when the toggle arms of the check straighten out and reach the limit of their movement and to thereby arrest the check by the cushioning action of the bumper and a stop adjacent the said lever for arresting the movement of the lever when the door closes and the toggle arms tend to fold, the said stop limiting movement of the lever to a very small distance.

5. A door check comprising a pair of toggle arms, one of which can be pivoted to one member of a pair of members, a door pillar and a body pillar, a lever for pivoting to the other member of the pair of members and to the other toggle arm, a deformable bumper on said lever arranged to contact a surface and be distorted when the toggle arms of the check straighten out and reach the limit of their movement and to thereby arrest the check by the cushioning action of the bumper, the said lever being a bell crank arm in which one end of the bell crank is pivoted to one of said members, the other end of the bell crank carrying the bumper and the elbow of the bell crank having a pivotal connection with the toggle arm, and an anchoring bracket for pivoting the bell crank to one of said members and provided with a turned-over lug to act as a stop to restrict the bell crank to a very limited movement.

6. A door check comprising a pair of toggle arms, one of which can be pivoted to one member of a pair of members, a door pillar and a body pillar, a lever for pivoting to the other member of the pair of members and to the other toggle arm, a deformable bumper on said lever arranged to contact a surface and be distorted when the toggle arms of the check straighten out and reach the limit of their movement and to thereby arrest the check by the cushioning action of the bumper and a torsion or clock spring having its inner end anchored to the pivot between the said lever and the toggle arm and its outer end stressing the toggle arm to straighten the toggle and open the door.

7. A door check comprising a pair of toggle arms, one of which can be pivoted to one member of a pair of members, a door pillar and a body pillar, a lever for pivoting to the other member of the pair of members and to the other toggle arm and a deformable bumper on said lever arranged to contact a surface and be distorted when the toggle arms of the check straighten out and reach the limit of their movement and to thereby arrest the check by the cushioning action of the bumper, one of the toggle arms being made of two sections telescoping together and adjustable with respect to each other.

8. A door check comprising a pair of toggle arms, one of which can be pivoted to one member of a pair of members, a door pillar and a body pillar, a lever for pivoting to the other member of the pair of members and to the other toggle arm and a deformable bumper on said lever arranged to contact a surface and be distorted when the toggle arms of the check straighten out and reach the limit of their movement and to thereby arrest the check by the cushioning action of the bumper, one toggle arm made up of two sections that comprise an internally threaded sleeve and an externally threaded stem which screw together to permit the alteration of the length of the toggle arm.

*9. A door check, comprising a pair of toggle arms one of which can be pivotally attached to one of a pair of members to wit: a door pillar and a body pillar, a lever for pivoting to the other member of the pair of members and the other toggle arm, a stop engaged by one of the toggle arms to arrest the toggle arms near their straight line position to prevent them from throwing over center, and a yieldable resistance member connected with and stressed by said lever when the toggle arms are arrested short of throwing over center to thereby cushion the checking of the door when thrown to its fully open position.*

*10. A door check, comprising a pair of toggle arms one of which can be pivotally attached to one of a pair of members, to wit: a door pillar and a body pillar, a lever for pivoting to the other member of the pair of members and the other toggle arm, a stop engaged by one of the toggle arms to arrest the toggle arms near their straight line position to prevent them from throwing over center, a yieldable resistance member connected with and stressed by said lever when the toggle arms are arrested short of throwing over center to thereby cushion the checking of the door when thrown to its fully open position, and a stop engaging said lever for limiting its movement in one direction so that the toggle arms will be effective to straighten out.*

*11. A door check, comprising a pair of toggle arms one of which can be pivotally attached to one of a pair of members, to wit: a door pillar and a body pillar, a lever for pivoting to the other member of the pair of members and the other toggle arm, a stop on one toggle arm engaged by the other toggle arm to arrest the toggle arms near their straight line position to prevent them from throwing over center, and yieldable means connected with said lever for tending to throw the said toggle arms to their arrested near*

*straight line position when the door is unlatched and for then cushioning the check of the door when opened to the near straight line position of the toggle arms.*

*12. A door check, comprising a pair of toggle arms one of which can be pivotally attached to one of a pair of members, to wit: a door pillar and a body pillar, a lever for pivoting to the other member of the pair of members and the other toggle arm, a stop on one toggle arm engaged by the other toggle arm to arrest the toggle arms near their straight line position to prevent them from throwing over center, yieldable means including a device for storing energy connected with the lever and toggle arms and put under augmented stress to store energy when the toggle arms are folded and the door closed, said yieldable means when the door is unlatched applying the stored energy to the toggle arms to aid in unfolding them and holding the door in open position and said yieldable means yieldingly resisting the final checking of the door and the straightening of the second toggle formed by the lever and the two said toggle arms when arrested in their near straight line position, to thereby cushion the door at the extremity of its opening movement.*

FRANK O. RILEY.
ROY F. ANDERSON.

REFERENCES CITED

The following references are of record in the file of this patent, or the original patent:

UNITED STATES PATENTS

| Number | Name | Date |
|---|---|---|
| 1,133,453 | Ball | Mar. 30, 1915 |

FOREIGN PATENTS

| Number | Country | Date |
|---|---|---|
| 3,488 | Great Britain | Mar. 8, 1887 |